United States Patent
Smith et al.

(10) Patent No.: US 7,164,309 B1
(45) Date of Patent: Jan. 16, 2007

(54) VOLTAGE MULTIPLIER CIRCUIT INCLUDING A CONTROL CIRCUIT PROVIDING DYNAMIC OUTPUT VOLTAGE CONTROL

(75) Inventors: Paul Smith, Glasgow (GB); John Shaw, Linlithgow (GB)

(73) Assignee: Micrel, Inc., San Jose, CA (US)

( * ) Notice: Subject to any disclaimer, the term of this patent is extended or adjusted under 35 U.S.C. 154(b) by 14 days.

(21) Appl. No.: 11/170,285

(22) Filed: Jun. 28, 2005

(51) Int. Cl.
*G05F 1/10* (2006.01)

(52) U.S. Cl. .................................... 327/539

(58) Field of Classification Search .............. 327/535, 327/536, 537, 539
See application file for complete search history.

(56) References Cited

U.S. PATENT DOCUMENTS

| 6,400,211 B1 * | 6/2002 | Yokomizo et al. .......... 327/536 |
| 6,734,717 B1 | 5/2004 | Min |
| 6,859,091 B1 * | 2/2005 | Nicholson et al. .......... 327/536 |

OTHER PUBLICATIONS

Pierre Favrat et al., "A New High Efficiency CMOS Voltage Doubler," IEEE 1997 Custom Integrated Circuits Conference, pp. 259-262.

Kyeong-Sik Min et al., "CMOS Charge Pumps Using Cross-Coupled Charge Transfer Switches with Improved Voltage Pumping Gain and Low Gate-Oxide Stress for Low-Voltage Memory Circuits," IEEE International Symposium on Circuits and Systems (ISCAS) 2002, vol. 5, pp. V-545-V-548.

* cited by examiner

*Primary Examiner*—Jeffrey Zweizig
(74) *Attorney, Agent, or Firm*—Patent Law Group LLP; Carmen C. Cook

(57) ABSTRACT

A voltage multiplier circuit includes a control circuit and a first voltage multiplier stage. The control circuit receives a power supply voltage and a reference voltage and provides a first output voltage being the difference between a first selected voltage and the power supply voltage where the first selected voltage is a function of the reference voltage and is independent of variations in the power supply voltage. The first voltage multiplier stage receives the first output voltage and a clock voltage signal having a clock voltage value and provides a second output voltage being the sum of the first output voltage and the clock voltage value. When the clock voltage value is equal to the power supply voltage, the second output voltage of the first voltage multiplier stage is the first selected voltage independent of any power supply voltage variations.

18 Claims, 2 Drawing Sheets

VOLTAGE MULTIPLIER CIRCUIT INCLUDING A CONTROL CIRCUIT PROVIDING DYNAMIC OUTPUT VOLTAGE CONTROL

FIELD OF THE INVENTION

The invention relates to voltage multiplier circuits and, in particular, to a voltage multiplier circuit incorporating a control circuit for providing dynamic control of the output voltage.

DESCRIPTION OF THE RELATED ART

Voltage multiplier circuits for generating operational voltages higher than a power supply voltage provided from an external source are known. Typically, a voltage multiplier circuit receives two fixed input voltages, one of the input voltages being the power supply voltage and the other being a clock voltage. The voltage multiplier provides an output voltage being the sum of its two input voltages. When the two fixed input voltages are the same, the voltage multiplier circuit generates an output voltage that is N times the power supply voltage where N is the number of voltage multiplication stages. In general, a voltage multiplier circuit may include two or more voltage multiplier stages to provide an output voltage that is two or more times the input power supply voltage. Exemplary types of voltage multiplier circuits include voltage multiplier circuits and voltage doubler circuits.

FIG. 1 is a block diagram of a conventional two-stage voltage multiplier circuit. Referring to FIG. 1, voltage multiplier circuit 1 includes a first voltage multiplier stage 10 (Voltage Multiplier Stage 1) and a second voltage multiplier stage 15 (Voltage Multiplier Stage 2). Voltage multiplier circuit 1 receives a power supply voltage $V_{DD}$ as the first input voltage and a clock signal and its inverse, denoted as a clock voltage signal $V_{CLK}$ and its inverse $V_{CLK}\backslash$, as the second input voltage. At first voltage multiplier stage 10, an output voltage $V_{OUT1}$ is generated where $V_{OUT1}=V_{DD}+\Delta V$. The output voltage $V_{OUT1}$ is coupled as an input voltage to second voltage multiplier stage 15. Second voltage multiplier stage 15 adds another voltage $\Delta V$ to its input voltage and provides an output voltage $V_{OUT2}$ being $V_{OUT2}=V_{DD}+2\Delta V$. The $\Delta V$ voltage represents a voltage increment introduced by each voltage multiplier stage and is usually equal to the second input voltage, that is, the clock voltage signal $V_{CLK}$. When voltage $V_{CLK}=\Delta V=V_{DD}$, voltage doubling is realized at first voltage multiplier stage 10. That is, $V_{OUT1}=V_{DD}+\Delta V=2V_{DD}$. The final output voltage of voltage multiplier circuit 1 is voltage $V_{OUT2}=V_{DD}+2\Delta V=3V_{DD}$. By incorporating multiple voltage multiplier stages, a final output voltage being N times the power supply voltage can be obtained.

One example of a voltage multiplier circuit is a voltage double circuit described in an article entitled "A New High efficiency CMOS Voltage Doubler," by Pierre Favrat et al., IEEE Custom Integrated Circuits Conference, 1997, pages 259 to 262. Favrat et al. describes using a charge pump cell to make a voltage doubler using improved serial switches. The voltage double circuit architecture allows the voltage doubler circuit to achieve very high efficiency, particularly for heavy capacitive loads.

In the conventional voltage multiplier circuits, the output voltage of each voltage multiplication stage is a function of the input power supply voltage. Therefore, the output voltage of each stage will vary in accordance with variations in the input power supply voltage. In some applications, such variations in the voltage multiplier circuit output voltage is not desired, particularly when the voltage multiplier circuit is used to drive MOS devices where precision in the gate drive voltages is critical.

Therefore, a voltage multiplier circuit capable of providing an output voltage that can be made stable over input voltage variations is desired.

SUMMARY OF THE INVENTION

According to one embodiment of the present invention, a voltage multiplier circuit includes a control circuit and a first voltage multiplier stage. The control circuit has a first input terminal coupled to receive a power supply voltage, a second input terminal coupled to receive a reference voltage. The control circuit provides a first output voltage having a voltage value being the difference between a first selected voltage and the power supply voltage where the first selected voltage is a function of the reference voltage and is independent of variations in the power supply voltage. The first voltage multiplier stage has a first input terminal receiving the first output voltage of the control circuit and second and third input terminals receiving a clock voltage signal and its inverse where the clock voltage signal having a clock voltage value. The first voltage multiplier stage provides a second output voltage being the sum of the first output voltage and the clock voltage value.

In one embodiment, when the clock voltage value is equal to the power supply voltage, the second output voltage is equal to the first selected voltage which is a function of the reference voltage and is independent of variations in the power supply voltage.

According to one embodiment of the present invention, a voltage multiplier circuit includes a control circuit, a first voltage multiplier stage and a second voltage multiplier stage. The control circuit has a first input terminal coupled to receive a first power supply voltage and a second input terminal coupled to receive a reference voltage. The control circuit provides a first output voltage having a voltage value being the difference between a first selected voltage and the first power supply voltage where the first selected voltage is a function of the reference voltage and is independent of variations in the first power supply voltage. The first voltage multiplier stage has a first input terminal receiving the first output voltage of the control circuit and second and third input terminals receiving a first clock voltage signal and its inverse where the first clock voltage signal has a first clock voltage value. The first voltage multiplier stage provides a second output voltage being the sum of the first output voltage and the first clock voltage value. The second voltage multiplier stage has a first input terminal receiving the second output voltage of the first voltage multiplier stage and second and third input terminals receiving a second clock voltage signal and its inverse where the second clock signal has a second clock voltage value. The second voltage multiplier stage provides a third output voltage being the sum of the second output voltage and the second clock voltage value.

In one embodiment, the first clock voltage value is equal to the first power supply voltage and the second clock voltage value is equal to a second power supply voltage, the second output voltage is equal to the first selected voltage and the third output voltage has a voltage value equal to the sum of the first selected voltage and the second power supply voltage.

According to another aspect of the present invention, a method of generating an output voltage using a power supply voltage, a reference voltage, and a first clock voltage signal having a first clock voltage value includes generating a first voltage having a voltage value being the difference between a first selected voltage and the power supply voltage where the first selected voltage is a function of the reference voltage and is independent of variations in the power supply voltage, generating a second voltage using a first voltage multiplier stage where the first voltage multiplier stage receives the first clock voltage signal and the second voltage is the sum of the first voltage and the first clock voltage value. The second voltage is the output voltage.

According to yet another aspect of the present invention, a method of generating a gate drive voltage for an NMOS transistor where the NMOS transistor has a drain terminal coupled to a first power supply voltage and a source terminal coupled to a load includes generating a first voltage having a voltage value being the difference between a first selected voltage and a second power supply voltage where the first selected voltage is a function of a reference voltage and is independent of variations in the second power supply voltage, generating a second voltage using a first voltage multiplier stage where the first voltage multiplier stage receives a first clock voltage signal having a first clock voltage value equal to the second power supply voltage and the second voltage is the sum of the first voltage and the first clock voltage value and therefore is equal to the first selected voltage, generating a third voltage using a second voltage multiplier stage where the second voltage multiplier stage receives a second clock voltage signal having a second clock voltage value equal to the first power supply voltage. The third voltage is the sum of the second voltage and the second clock voltage value and therefore is equal to the sum of the first selected voltage and the first power supply voltage. Finally, the method includes applying the third voltage as the gate drive voltage for the NMOS transistor. The application of the third voltage as the gate drive voltage resulting in a gate-to-drain voltage at the NMOS transistor having a voltage value equal to the first selected voltage and being substantially constant over variations of the first power supply voltage.

The present invention is better understood upon consideration of the detailed description below and the accompanying drawings.

DETAILED DESCRIPTION OF THE PREFERRED EMBODIMENTS

In accordance with the principles of the present invention, a voltage multiplier circuit incorporates a control circuit for providing dynamic control of the voltage multiplier output voltage. Specifically, the voltage multiplier output voltage is controlled through the dynamic control of a driving voltage coupled to drive the one or more voltage multiplier stages of the voltage multiplier circuit. In one embodiment, the control circuit controls the output voltage of a multi-stage voltage multiplier circuit through the continuous control of the input voltage to the first voltage multiplier stage. In this manner, the output voltage of the first voltage multiplier stage is made independent of the variations of the input power supply voltage $V_{DD}$ and the output voltage of the remaining voltage multiplier stages of the voltage multiplier circuit is the sum of this Vdd-independent voltage and a multiple of the power supply voltage.

More specifically, the voltage multiplier circuit of the present invention incorporates a control circuit for generating a drive voltage $V_{DRV}$ to be used as the input voltage to the one or more voltage multiplier stages of the voltage multiplier circuit. The control circuit receives the power supply voltage $V_{DD}$ as a first input voltage and a reference voltage $V_{REF}$ as a second input voltage. The control circuit operates to generate the drive voltage $V_{DRV}$ as a function of the reference voltage $V_{REF}$ and the power supply voltage $V_{DD}$. When the drive voltage $V_{DRV}$ is coupled to drive the voltage multiplier circuit and when the first voltage multiplier stage receives a clock voltage that is equal to the power supply voltage, the output voltage of the first voltage multiplier stage of the voltage multiplier circuit will become independent of variations in the power supply voltage $V_{DD}$.

By using the control circuit to provide dynamic control of the drive voltage to the voltage multiplier stages, the voltage multiplier circuit of the present invention eliminates the need for any feedback control circuitry for controlling the output voltage. Thus, no current is drawn from the voltage multiplier output terminal, allowing the output voltage to maintain maximum voltage amplification efficiency.

Figure 2:
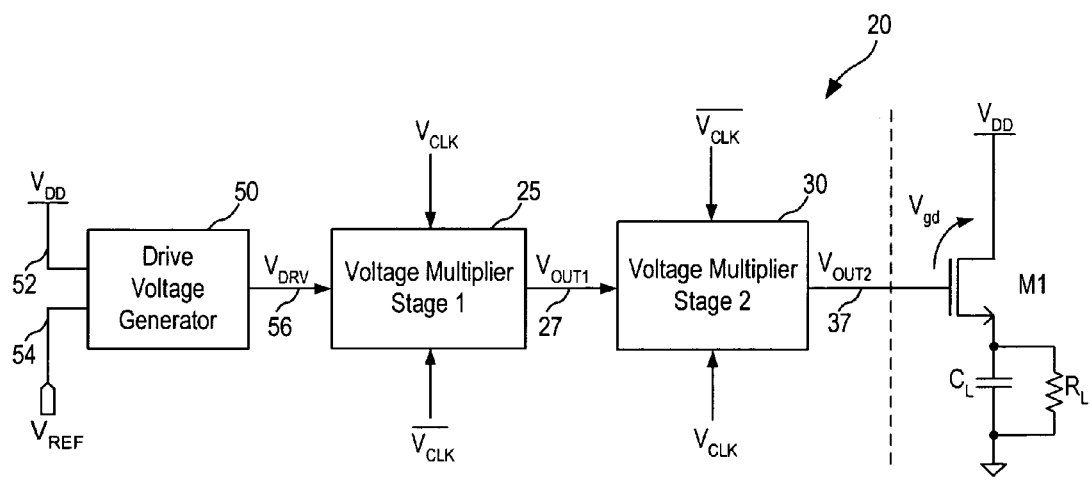
FIG. 2 is a circuit diagram of a two-stage voltage multiplier circuit incorporating a drive voltage generator according to one embodiment of the present invention.

FIG. 2 is a circuit diagram of a two-stage voltage multiplier circuit incorporating a drive voltage generator according to one embodiment of the present invention. Referring to FIG. 2, a voltage multiplier circuit 20 in accordance with the present invention receives a power supply voltage $V_{DD}$ as a first input voltage, a reference voltage $V_{REF}$ as a second input voltage, and a clock voltage signal $V_{CLK}$ and its inverse $V_{CLK}\backslash$ as a third input voltage. Voltage multiplier circuit 20 provides an output voltage, denoted voltage $V_{OUT2}$, on an output terminal 37. The output voltage $V_{OUT2}$ has a voltage value that includes a first voltage portion being substantially independent of variations in the power supply voltage $V_{DD}$ and a second voltage portion being the clock voltage $V_{CLK}$. When the clock voltage $V_{CLK}$ has a voltage magnitude equal to the power supply voltage $V_{DD}$, output voltage $V_{OUT2}$ has a voltage value that includes a first voltage portion being substantially independent of variations in the power supply voltage $V_{DD}$ and a second voltage portion being the power supply $V_{DD}$ voltage. In other embodiments, the voltage multiplier circuit in accordance with the present invention can include one or more voltage multiplier stages, as will be described in more detail below.

In the present illustration, the output voltage $V_{OUT2}$ is coupled to the gate terminal of an NMOS transistor M1 as the gate drive voltage. The drain terminal of NMOS transistor is connected to the power supply $V_{DD}$ voltage. When voltage multiplier circuit 20 is thus applied, the resulting gate-to-drain voltage across NMOS transistor M1 will be a voltage that is independent of the power supply voltage. Thus, the voltage multiple circuit of the present invention can be advantageously applied in certain applications to drive an MOS transistor so as to obtain a constant gate-to-drain voltage independent of the power supply voltage.

In the present embodiment, the voltage multiplier circuit of the present invention is coupled to drive the gate terminal of an NMOS transistor. This application of the voltage multiplier circuit of the present invention is illustrative only and is not intended to be limiting. The voltage multiplier circuit of the present invention can be used in other applications where an operating voltage greater than the input power supply voltage and being substantially constant is required. The exact application of the voltage multiplier circuit is not critical to the construction and operation of the voltage multiplier circuit of the present invention. However, when the voltage multiplier circuit output voltage (voltage $V_{OUT2}$) is coupled to drive the gate of an NMOS transistor, the voltage multiplier circuit of the present invention provides particular advantages.

In particular, in the present illustration, NMOS transistor M1 has a drain terminal coupled to the power supply voltage $V_{DD}$ and a source terminal coupled to an output load, represented as a load capacitor $C_L$ and a load resistor $R_L$ connected in parallel between the source terminal of transistor M1 and a ground potential. When the output voltage $V_{OUT2}$ of voltage multiplier circuit 20 is coupled as the gate voltage to drive the gate terminal of NMOS transistor M1, the power supply voltage portion of voltage $V_{OUT2}$ will be canceled by the drain voltage of transistor M1 which is the power supply VDD voltage. The resultant gate-to-drain voltage $V_{gd}$ of transistor M1 is thus a voltage independent of the power supply $V_{DD}$ voltage. In fact, the resultant gate-to-drain voltage $V_{gd}$ of transistor M1 is the first voltage portion of the output voltage $V_{OUT2}$.

In general, it is desirable to apply the maximum gate drive voltage to fully enhance the channel of NMOS transistor M1. By ensuring that transistor M1 is fully enhanced, the "on" resistance of transistor M1 is minimized and the size of the transistor M1 can then be minimized to reduce the silicon area required for implementation. However, care must also be taken to ensure that the applied gate voltage does not exceed the maximum oxide voltage rating for transistor M1. Each fabrication process technology defines a maximum oxide voltage rating relating to the maximum voltage that can be applied across the gate oxide layer of the transistor which maximum voltage must not be exceeded or transistor damage will result.

For the circuit application shown in FIG. 2, a constant gate-to-drain voltage $V_{gd}$ is necessary because a maximum gate drive voltage is applied to transistor M1 to fully enhance the transistor channel. If the gate-to-drain voltage $V_{gd}$ is allowed to vary with the $V_{DD}$ voltage, the variations in the $V_{DD}$ voltage may cause the gate-to-drain voltage to exceed the maximum oxide voltage rating, resulting in damages to the gate oxide layer of transistor M1. When the output voltage $V_{OUT2}$ of voltage multiplier circuit 20 is used to drive the gate terminal of transistor M1, the dynamic output voltage control provided by the voltage multiplier of the present invention makes it possible to maintain a gate-to-drain voltage $V_{gd}$ across NMOS transistor M1 that is substantially independent of variations in the power supply $V_{DD}$ voltage while ensuring that the gate drive voltage is at a voltage level sufficiently high to fully enhance the transistor.

There are other disadvantages associated with not having a constant gate-to-drain voltage for transistor M1 in the configuration shown in FIG. 2. If the gate-to-drain voltage $V_{gd}$ cannot be kept constant, the drive voltage applied to NMOS transistor would have to be made smaller than the maximum gate drive voltage so that over all process corners the maximum oxide voltage is not exceeded. A consequence of using a smaller than maximum $V_{gd}$ voltage is that at some process corners the $V_{gd}$ voltage would be too small to fully enhance the channel of the NMOS transistor. As a result, the "on" resistance of the NMOS transistor would be larger than desired. Thus, to ensure that the "on" resistance is of a satisfactory value for all process corners when the maximum gate drive is not used, the size of the NMOS transistor has to be increased, thereby consuming more silicon area.

However, in accordance with the present invention, the control circuit of voltage multiplier circuit 20 provides dynamic control of the output voltage $V_{OUT2}$ so that the gate voltage of NMOS transistor M1 can be maintained at a level so that the resulting gate-to-drain voltage of the transistor can be maintained substantially constant over all process corners and variations in the power supply voltage $V_{DD}$. Thus, the maximum gate drive voltage for the NMOS transistor can be used to fully enhance the NMOS transistor and the size of the NMOS switch can be kept to a minimum while maintaining an optimal "on" resistance.

Figure 1:
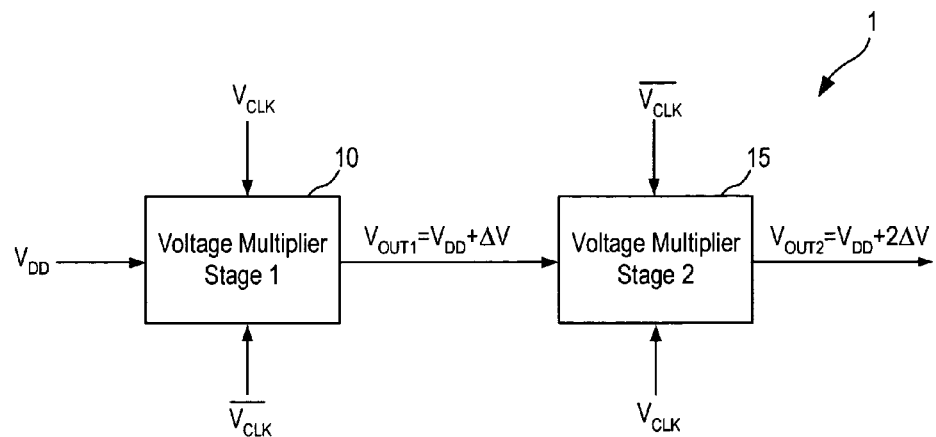
FIG. 1 is a block diagram of a conventional two-stage voltage multiplier circuit where each stage operates as a voltage doubler.

In the present embodiment, voltage multiplier circuit 20 is implemented as a two-stage voltage multiplier circuit where each voltage multiplier stage is implemented as a voltage doubler circuit. Specifically, voltage multiplier circuit 20 includes a first voltage multiplier stage 25 and a second voltage multiplier stage 30 configured in the same manner as shown in FIG. 1. Voltage multiplier circuit 20 further includes a drive voltage generator circuit 50 for generating a drive voltage $V_{DRV}$ to drive the one or more stages of the voltage multiplier circuit. Drive voltage generator circuit 50 has a first terminal 52 for receiving the power supply voltage $V_{DD}$ and a second input terminal 54 for receiving the reference voltage $V_{REF}$. Drive voltage generator circuit 50 provides the drive voltage $V_{DRV}$ on an output terminal 56. Clock voltage signal $V_{CLK}$ and its inverse $V_{CLK}\backslash$ are coupled to first and second voltage multiplier stages 25 and 30 directly. The output voltage $V_{OUT2}$ of second voltage multiplier stage 30 is the final output voltage of voltage multiplier circuit 20.

First, the operation of the first and second voltage multiplier stages 25 and 30 is described. First voltage multiplier stage 25 receives drive voltage $V_{DRV}$ and clock voltage signal $V_{CLK}$ (and its inverse) as input voltages. First voltage multiplier stage 25 generates an output voltage $V_{OUT1}$ on an output terminal 27 being the sum of its two input voltages. That is:

$$V_{OUT1} = V_{DRV} + V_{CLK}. \qquad \text{Eq. (1)}$$

Output voltage $V_{OUT1}$ is coupled as the input voltage of second voltage multiplier stage 30 which also receives clock voltage signal $V_{CLK}$ (and its inverse) as an input voltage. Second voltage multiplier stage 30 generates the output voltage $V_{OUT2}$ on output terminal 37 being the sum of its two input voltages. That is:

$$V_{OUT2} = V_{OUT1} + V_{CLK}. \qquad \text{Eq. (2)}$$

By substituting Equation (1) for voltage $V_{OUT1}$ into Equation (2), output voltage $V_{OUT2}$ can be given as:

$$V_{OUT2} = V_{DRV} + 2V_{CLK}. \qquad \text{Eq. (3)}$$

In most applications, the clock voltage $V_{CLK}$ is the power supply voltage $V_{DD}$. Thus, each voltage multiplier stage in the voltage multiplier circuit essentially operates to add one power supply $V_{DD}$ voltage to the drive voltage coupled to the first voltage multiplier stage. Thus, the output voltage $V_{OUT2}$ of voltage multiplier circuit 20 can be given as:

$$V_{OUT2} = V_{DRV} + 2V_{DD}, \qquad \text{Eq. (3a)}$$

where voltage $V_{CLK}$ is equal to power supply voltage $V_{DD}$.

When output voltage $V_{OUT2}$ is coupled to drive the gate terminal of NMOS transistor M1, a gate-to-drain voltage $V_{gd}$ develops across the gate and drain terminals of the NMOS transistor. Specifically, the gate-to-drain voltage $V_{gd}$ is given as:

$$V_{gd} = V_{OUT2} - V_{DD}. \qquad \text{Eq. (4)}$$

Because the gate-to-drain voltage $V_{gd}$ of the NMOS transistor M1 must not exceed the maximum oxide voltage rating of the fabrication process, hereinafter denoted as voltage $V_{MAX}$, it is therefore important for the gate voltage of NMOS transistor M1 to follow any variations in the power supply voltage $V_{DD}$ in order to maintain a constant voltage across the gate oxide of the transistor. In the present illustration, it is also important that the gate voltage of transistor M1 be high enough to fully enhance the NMOS transistor channel to realize minimal "on" resistance (Rdson) of the transistor.

When the clock voltage signal $V_{CLK}$ is derived from the power supply voltage $V_{DD}$ and therefore $V_{CLK}=V_{DD}$, the final output voltage $V_{OUT2}$ can be expressed as:

$$V_{OUT2} = V_{OUT1} + V_{DD}. \qquad \text{Eq. (5)}$$

Then, when Equation (5) above for voltage is $V_{OUT2}$ substituted into Equation (4), the gate-to-drain voltage $V_{gd}$ is given as:

$$V_{gd} = (V_{OUT1} + V_{DD}) - V_{DD}, \text{ and}$$

$$V_{gd} = V_{OUT1}. \qquad \text{Eq. (6)}$$

The gate-to-drain voltage $V_{gd}$ is therefore equal to output voltage $V_{OUT1}$ (i.e., $V_{gd} = V_{OUT1}$) of the first voltage multiplier stage 25.

Thus, if output voltage $V_{OUT1}$ of the first voltage multiplier stage 25 can be maintained constant over variations of the power supply voltage $V_{DD}$, the gate-to-drain voltage $V_{gd}$ of transistor M1 will thus remain constant and the operation of transistor M1 is thus optimized. In accordance with the present invention, drive voltage $V_{DRV}$ is generated in a manner so that when the drive voltage is coupled as an input voltage to drive first voltage multiplier stage 25, the output voltage $V_{OUT1}$ will be independent of variations in the power supply voltages. The output voltage $V_{OUT1}$ can be selected to achieve the desired gate-to-drain voltage for driving transistor M1.

Figure 3:
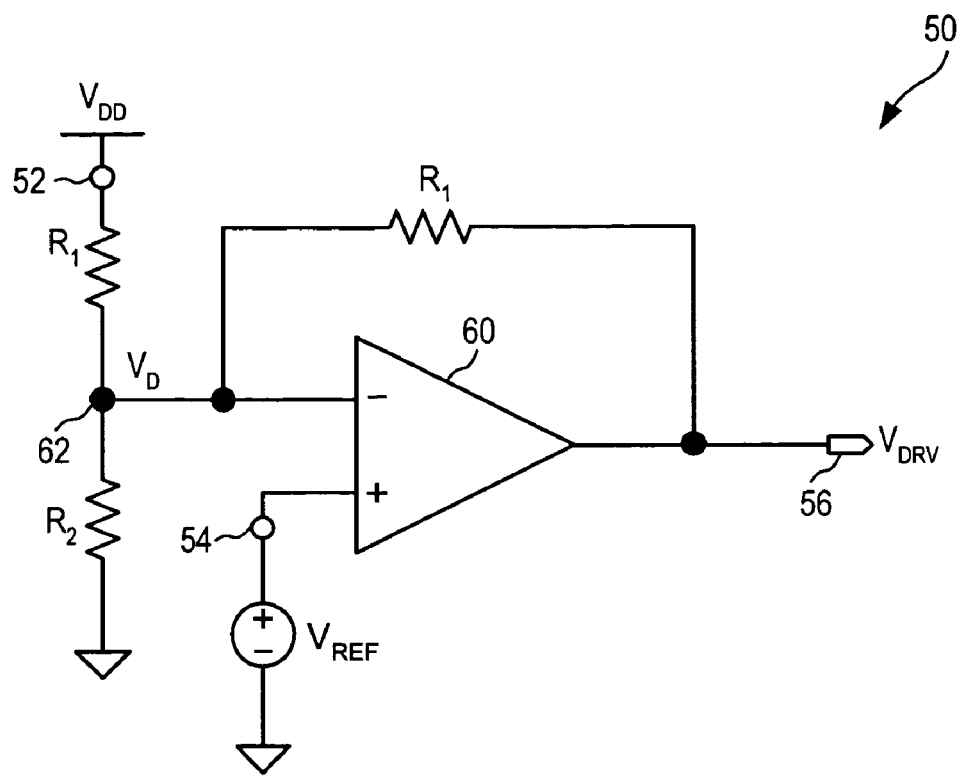
FIG. 3 is a circuit diagram of the drive voltage generator circuit according to one embodiment of the present invention.

The construction and operation of drive voltage generator circuit 50 will now be described. FIG. 3 is a circuit diagram of the drive voltage generator circuit according to one embodiment of the present invention. Referring to FIG. 3, drive voltage generator circuit 50 includes an operational amplifier (op-amp) 60 configured in a differential amplifier configuration. Specifically, drive voltage generator circuit 50 has a first input terminal 52 coupled to receive the power supply voltage $V_{DD}$. A resistor $R_1$ and a resistor $R_2$ are connected in series between power supply $V_{DD}$ voltage (terminal 52) and the ground potential. Resistors $R_1$ and $R_2$ act as a voltage divider for the $V_{DD}$ voltage and a divided voltage $V_D$ is generated at the center node 62. The divided voltage $V_D$ is coupled to the negative input terminal of op-amp 60. The positive input terminal of op-amp 60 is the second input terminal 54 of drive voltage generator circuit 50 and is coupled to receive the reference voltage $V_{REF}$. A feedback resistor $R_1$ is coupled between the output terminal 56 and the negative input terminal of op-amp 60. The use of the notation "$R_1$" for the two resistors in FIG. 3 indicates that the two resistors have the same resistance values. Op-amp 60 provides the drive voltage $V_{DRV}$ as the output voltage on terminal 56.

The drive voltage $V_{DRV}$ of drive voltage generator circuit 50 is given as follows:

$$V_{DRV} = V_{MAX} - V_{DD}, \text{ where} \qquad \text{Eq. (7)}$$

$$V_{MAX} = 2*V_{REF} + V_{REF}*(R1/R2). \qquad \text{Eq. (8)}$$

Drive voltage generator circuit 50 can be configured to have any value of voltage $V_{MAX}$ by selecting the appropriate reference voltage $V_{REF}$ and resistor ratio (R1/R2).

When drive voltage $V_{DRV}$ is coupled as the input voltage to first voltage multiplier stage 25 (FIG. 2) and voltage $V_{CLK}$ is equal to the power supply voltage $V_{DD}$ (i.e., $V_{CLK}=V_{DD}$), the output voltage $V_{OUT1}$ of the first voltage multiplier stage can be derived by substituting equation (7) into equation (1) as follows (equation (1) is repeated here):

$$V_{OUT1} = V_{DRV} + V_{CLK}, \text{ and} \qquad \text{Eq. (1)}$$

$$V_{OUT1} = (V_{MAX} - V_{DD}) + V_{DD}, \text{ and}$$

$$V_{OUT1} = V_{MAX}. \qquad \text{Eq. (9)}$$

By generating drive voltage $V_{DRV}$ using voltage generator circuit 50 of the present invention, output voltage $V_{OUT1}$ of first voltage multiplier stage 25 is no longer dependent on the power supply voltage $V_{DD}$ but rather remains constant at a voltage value $V_{MAX}$. The voltage value for voltage $V_{MAX}$ is guaranteed by the correct design of op-amp 60 (FIG. 3) to remain constant. Thus, when voltage multiplier circuit 20 is coupled to drive the gate terminal of NMOS transistor M1 as shown in FIG. 2, the gate-to-drain voltage $V_{gd}$ of NMOS transistor M1 remains constant at a voltage value of $V_{MAX}$. The voltage value of $V_{MAX}$ can be set to any desirable value and in particular, can be set high enough to fully enhance NMOS transistor M1 and thereby keeping the "on" resistance (Rdson) of NMOS transistor M1 low without violating the maximum oxide voltage rating of the fabrication process.

In sum, the voltage multiplier circuit of the present invention can be used to provide an optimal gate drive voltage for a transistor switch so that the gate drive voltage is sufficiently high to ensure a low "on" resistance while it is guaranteed to be no more than a safe process maximum voltage over manufacturing process variations. Furthermore, the transistor switch can be implemented using minimum silicon area since the "on" resistance of the transistor switch is optimized.

In one embodiment, first and second voltage multiplier stages 25, 30 are implemented using the voltage doubler circuit architecture described in the aforementioned IEEE paper by Favrat et al. In other embodiments, other voltage multiplier circuit architectures can be used to implement the voltage multiplier stages. Regardless of the circuit architecture of the voltage multiplier stages, the drive voltage generator circuit of the present invention provides dynamic control of the input voltage to the voltage multiplier stages so as to realize control of the final output voltage of the voltage multiplier circuit.

The voltage multiplier circuit of the present invention provides many advantages besides those described above. For instance, the voltage multiplier circuit of the present invention can be used to eliminate the need for high voltage rated circuit elements for the integrated circuit since the maximum on-chip voltage can be guaranteed. Thus, complex and additional fabrication process steps required for high voltage rated circuit elements are reduced or eliminated.

ALTERNATE EMBODIMENTS

In the above-described embodiments, the voltage multiplier circuit includes two voltage multiplier stages. The voltage multiple circuit of the present invention incorporating the drive voltage generator can be implemented using any number of one or more voltage multiplier stages.

In one embodiment, a voltage multiple circuit of the present invention includes a drive voltage generator and a single voltage multiplier stage. When a single voltage multiplier stage is used, the output voltage of the voltage multiplier circuit is a voltage that is independent of the power supply voltage. That is, the output voltage $V_{OUT}$ of a single-stage voltage multiplier circuit is given as:

$$V_{OUT} = V_{DRV} + V_{CLK}, \text{ and}$$

$$V_{OUT} = V_{DRV} + V_{DD}, \text{ when } V_{CLK} = V_{DD}. \quad \text{Eq. (10)}$$

When the equation for the drive voltage $V_{DRV}$ is substituted into equation (10), the output voltage $V_{OUT}$ of a single-stage voltage multiplier circuit becomes:

$$V_{OUT} = (V_{MAX} - V_{DD}) + V_{DD},$$

$$V_{OUT} = V_{MAX}. \quad \text{Eq. (11)}$$

Voltage $V_{MAX}$, given by equation (8) above, is a function of the reference voltage $V_{REF}$ only. Thus, a single-stage voltage multiplier circuit of the present invention provides an output voltage that is a function of the reference voltage $V_{REF}$ only and is independent of the power supply voltage variations. Voltage $V_{MAX}$ is typically selected to have a voltage level greater than the power supply voltage to realize an increased voltage level at the first voltage multiplier stage.

When the voltage multiplier circuit of the present invention includes N number of voltage multiplier stages, the output voltage of the last voltage multiplier stage will include a first voltage portion being substantially independent of variations in the power supply voltage $V_{DD}$ and a second voltage portion being an N−1 multiple of the clock voltage $V_{CLK}$. When the clock voltage is equal to the power supply voltage $V_{DD}$, the final output voltage of the last voltage multiplier stage will include a first voltage portion being substantially independent of variations in the power supply voltage VDD and a second voltage portion being an N−1 mulitple of the power supply voltage $V_{DD}$.

Therefore, for an N-stage voltage multiplier circuit incorporating a drive voltage generator in accordance with the present invention, the final output voltage $V_{OUT}$ of the N-stage voltage multiplier circuit is given as:

$$V_{OUT} = V_{MAX} + (N-1)V_{DD}. \quad \text{Eq. (12)}$$

An N-stage voltage multiplier circuit can be advantageously applied in circuits when a cancellation of an (N−1) $V_{DD}$ voltage is needed. In that case, an N-stage voltage multiplier circuit can be applied in a circuit so that a resultant voltage $V_{MAX}$ is obtained where voltage $V_{MAX}$ is independent of the power supply voltage variations.

Furthermore, in the above-described embodiments, the first voltage multiplier stage 25 and the second voltage multiplier stage 30 receive the same clock voltage $V_{CLK}$. In other embodiments, the clock voltage signals driving the first voltage multiplier stage 25 and second voltage multiplier stage 30 can have different voltage values. For instance, the first voltage multiplier stage can receive a clock voltage signal $V_{CLK1}$ and its inverse while the second voltage multiplier stage can receive a clock voltage signal $V_{CLK2}$ and its inverse, where $V_{CLK1} \neq V_{CLK2}$. In general, the clock voltage is equal to the power supply voltage. Thus, when there are two clock voltages, there are generally two associated power supply voltages.

When clock voltage $V_{CLK1}$ driving the first voltage multiplier stage does not equal to clock voltage $V_{CLK2}$ driving the second voltage multiplier stage, certain conditions need to be met to ensure proper voltage cancellation in the operation of the voltage multiplier circuit of the present invention. For the purpose of this discussion, it is assumed that a first power supply voltage $V_{DD1}$ is coupled to the drive voltage generator while a second power supply voltage $V_{DD2}$ is coupled to the drain terminal of NMOS transistor M1 where voltage $V_{DD1}$ does not necessarily equal to voltage $V_{DD2}$.

First, to realize proper voltage cancellation at the first voltage multiplier stage so that an output voltage $V_{OUT1}$ at the first voltage multiplier stage can be made independent of the power supply voltage, the first clock voltage signal $V_{CLK1}$ must be equal to the power supply voltage $V_{DD1}$ coupled to the drive voltage generator. In that case, the output voltage $V_{OUT1}$ at the first voltage multiplier stage remains equal to $V_{MAX}$.

Specifically, when the drive voltage generator receives a power supply voltage $V_{DD1}$ as an input voltage, the drive voltage $V_{DRV}$ generated by the drive voltage generator is given as:

$$V_{DRV} = V_{MAX} - V_{DD1}.$$

When drive voltage $V_{DRV}$ is coupled to drive the first voltage multiplier stage and the first clock voltage signal $V_{CLK1}$ is equal to power supply voltage $V_{DD1}$, the output voltage $V_{OUT1}$ can be given as:

$$V_{OUT1} = (V_{MAX} - V_{DD1}) + V_{DD1},$$

$$V_{OUT1} = V_{MAX}.$$

Accordingly, when the first clock voltage signal $V_{CLK1}$ is equal to power supply voltage $V_{DD1}$, the output voltage of the first voltage multiplifier stage remains equal to voltage $V_{MAX}$ which is a voltage independent of the power supply voltage variations.

Second, when the voltage multiplier circuit of the present invention is coupled to provide a gate drive voltage for an NMOS transistor, to realize proper voltage cancellation at the gate-to-drain voltage of the NMOS transistor, the second clock voltage signal $V_{CLK2}$ must be equal to the second power supply voltage $V_{DD2}$ coupled to the drain terminal of NMOS transistor M1.

Thus, output voltage $V_{OUT2}$ of the second voltage multiplier circuit is given as:

$$V_{OUT2} = V_{OUT1} + V_{CLK2}, \text{ and}$$

$$V_{OUT2} = V_{MAX} + V_{DD2}.$$

When output voltage $V_{OUT2}$ is applied as the gate drive voltage for the NMOS transistor where the drain voltage is coupled to the second power supply voltage $V_{DD2}$, a gate-to-drain voltage $V_{gd}$ of voltage $V_{MAX}$ is maintained.

In sum, in the circuit application of FIG. 2, when the clock voltages for the first voltage multiplier stage and the second voltage multiplier stage can be different, the same voltage cancellation result can be obtained as long as the clock voltage $V_{CLK1}$ of the first stage is equal to the first power supply voltage $V_{DD1}$ coupled to the drive voltage generator and as long as the clock voltage $V_{CLK2}$ of the second stage is equal to the second power supply voltage $V_{DD2}$ coupled to the drain terminal of the transistor switch M1.

The above detailed descriptions are provided to illustrate specific embodiments of the present invention and are not intended to be limiting. Numerous modifications and variations within the scope of the present invention are possible. For example, one of ordinary skill in the art would appreciate that the voltage multiplier circuit of the present invention can be configured to drive a PMOS transistor switch with the appropriate change in voltage polarities. The present invention is defined by the appended claims.

We claim:

1. A voltage multiplier circuit comprising:
   a control circuit having a first input terminal coupled to receive a power supply voltage, a second input terminal coupled to receive a reference voltage, the control circuit providing a first output voltage having a voltage value being the difference between a first selected voltage and the power supply voltage, the first selected voltage being a function of the reference voltage and independent of variations in the power supply voltage; and
   a first voltage multiplier stage having a first input terminal receiving the first output voltage of the control circuit, second and third input terminals receiving a clock voltage signal and its inverse, the clock voltage signal having a clock voltage value, the first voltage multiplier stage providing a second output voltage being the sum of the first output voltage and the clock voltage value.

2. The voltage multiplier circuit of claim 1, wherein the clock voltage value is equal to the power supply voltage, the second output voltage is equal to the first selected voltage which is a function of the reference voltage and is independent of variations in the power supply voltage.

3. The voltage multiplier circuit of claim 1, wherein the control circuit comprises:
   a voltage divider comprising a first resistor having a first resistance value coupled between the first input terminal receiving the power supply voltage and a first node and a second resistor having a second resistance value coupled between the first node and a ground potential;
   an operational amplifier having a negative input terminal coupled to the first node, a positive input terminal being the second input terminal receiving the reference voltage, and an output terminal providing the first output voltage; and
   a third resistor having the first resistance value coupled between the output terminal and the negative input terminal of the operational amplifier,
   wherein the first selected voltage has a voltage value of $(2*V_{REF}+V_{REF}*(R1/R2))$, where $V_{REF}$ is the reference voltage and R1 denotes the first resistance value and R2 denotes the second resistance value.

4. A voltage multiplier circuit comprising:
   a control circuit having a first input terminal coupled to receive a first power supply voltage, a second input terminal coupled to receive a reference voltage, the control circuit providing a first output voltage having a voltage value being the difference between a first selected voltage and the first power supply voltage, the first selected voltage being a function of the reference voltage and independent of variations in the first power supply voltage;
   a first voltage multiplier stage having a first input terminal receiving the first output voltage of the control circuit, second and third input terminals receiving a first clock voltage signal and its inverse, the first clock voltage signal having a first clock voltage value, the first voltage multiplier stage providing a second output voltage being the sum of the first output voltage and the first clock voltage value; and
   a second voltage multiplier stage having a first input terminal receiving the second output voltage of the first voltage multiplier stage, second and third input terminals receiving a second clock voltage signal and its inverse, the second clock voltage signal having a second clock voltage value, the second voltage multiplier stage providing a third output voltage being the sum of the second output voltage and the second clock voltage value.

5. The voltage multiplier circuit of claim 4, wherein the control circuit comprises:
   a voltage divider comprising a first resistor having a first resistance value coupled between the first input terminal receiving the first power supply voltage and a first node and a second resistor having a second resistance value coupled between the first node and a ground potential;
   an operational amplifier having a negative input terminal coupled to the first node, a positive input terminal being the second input terminal receiving the reference voltage, and an output terminal providing the first output voltage; and
   a third resistor having the first resistance value coupled between the output terminal and the negative input terminal of the operational amplifier,
   wherein the first selected voltage has a voltage value Of $(2*V_{REF}+V_{REF}*(R1/R2))$, where $V_{REF}$ is the reference voltage and R1 denotes the first resistance value and R2 denotes the second resistance value.

6. The voltage multiplier circuit of claim 5, wherein the first and second clock voltage values are equal to the first power supply voltage, the second output voltage is equal to the first selected voltage and the third output voltage has a voltage value equal to the sum of the first selected voltage and the first power supply voltage.

7. The voltage multiplier circuit of claim 5, wherein the first clock voltage value is equal to the first power supply voltage and the second clock voltage value is equal to a second power supply voltage, the second power supply voltage being the same as or different from the first power supply voltage, the second output voltage is equal to the first selected voltage and the third output voltage has a voltage value equal to the sum of the first selected voltage and the second power supply voltage.

8. The voltage multiplier circuit of claim 7, wherein the third output voltage of the voltage multiplier circuit is coupled to drive the gate terminal of an NMOS transistor, the drain terminal of the NMOS transistor being coupled to the second power supply voltage and the source terminal being coupled to a load, the third output voltage being applied as the gate drive voltage for the NMOS transistor so that a gate-to-drain voltage of the NMOS transistor has a voltage value equal to the first selected voltage and is substantially constant over variations of the second power supply voltage.

9. The voltage multiplier circuit of claim 8, wherein the first selected voltage comprising a maximum oxide voltage rating associated with the fabrication process of the NMOS transistor.

10. A method of generating an output voltage using a power supply voltage, a reference voltage, and a first clock voltage signal having a first clock voltage value, the method comprising:
  generating a first voltage having a voltage value being the difference between a first selected voltage and the power supply voltage, the first selected voltage being a function of the reference voltage and independent of variations in the power supply voltage; and
  generating a second voltage using a first voltage multiplier stage, the first voltage multiplier stage receiving the first clock voltage signal, the second voltage being the sum of the first voltage and the first clock voltage value, the second voltage being the output voltage.

11. The method of claim 10, wherein the first clock voltage value is equal to the power supply voltage, and generating the second voltage comprises:
  generating the second voltage using the first voltage multiplier stage, the second voltage being equal to the first selected voltage.

12. The method of claim 10, further comprising:
  generating a third voltage using a second voltage multiplier stage, the second voltage multiplier stage receiving a second clock voltage signal having a second clock voltage value, the third voltage being the sum of the second voltage and the second clock voltage value, the third voltage being the output voltage.

13. The method of claim 12, wherein the first clock voltage value is equal to the power supply voltage and the second clock voltage value is equal to a second power supply voltage, and generating the second voltage and generating the third voltage comprise:
  generating the second voltage using the first voltage multiplier stage, the second voltage being equal to the first selected voltage; and
  generating the third voltage using the second voltage multiplier stage, the third voltage having a voltage value equal to the sum of the first selected voltage and the second power supply voltage.

14. A method of generating a gate drive voltage for an NMOS transistor, the NMOS transistor having a drain terminal coupled to a first power supply voltage and a source terminal coupled to a load, the method comprising:
  generating a first voltage having a voltage value being the difference between a first selected voltage and a second power supply voltage, the first selected voltage being a function of a reference voltage and independent of variations in the second power supply voltage;
  generating a second voltage using a first voltage multiplier stage, the first voltage multiplier stage receiving a first clock voltage signal having a first clock voltage value equal to the second power supply voltage, the second voltage being the sum of the first voltage and the clock voltage value and therefore being equal to the first selected voltage;
  generating a third voltage using a second voltage multiplier stage, the second voltage multiplier stage receiving a second clock voltage signal having a second clock voltage value equal to the first power supply voltage, the third voltage being the sum of the second voltage and the second clock voltage value and therefore being equal to the sum of the first selected voltage and the first power supply voltage; and
  applying the third voltage as the gate drive voltage for the NMOS transistor, resulting in a gate-to-drain voltage at the NMOS transistor having a voltage value equal to the first selected voltage and being substantially constant over variations of the first power supply voltage.

15. The method of claim 14, wherein the first selected voltage comprising a maximum oxide voltage rating associated with the fabrication process of the NMOS transistor.

16. The method of claim 15, wherein the first selected voltage is a function of the reference voltage and a ratio of two resistance values.

17. The method of claim 14, wherein the first power supply voltage is equal to or different from the second power supply voltage.

18. The method of claim 14, wherein the first clock voltage value is equal to or different from the second clock voltage value.

* * * * *